US011463498B2

(12) United States Patent
Toksoz et al.

(10) Patent No.: US 11,463,498 B2
(45) Date of Patent: *Oct. 4, 2022

(54) PERSISTING STATE OF A STREAMING APPLICATION

(71) Applicant: Google LLC, Mountain View, CA (US)

(72) Inventors: Tuna Toksoz, Mountain View, CA (US); Thomas Graham Price, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/906,857

(22) Filed: Jun. 19, 2020

(65) Prior Publication Data

US 2020/0322398 A1 Oct. 8, 2020

Related U.S. Application Data

(63) Continuation of application No. 16/406,280, filed on May 8, 2019, now Pat. No. 10,728,292, which is a continuation of application No. 15/213,994, filed on Jul. 19, 2016, now Pat. No. 10,326,806.

(51) Int. Cl.
*G06F 15/16* (2006.01)
*H04L 65/75* (2022.01)
*H04L 65/40* (2022.01)
*H04L 65/612* (2022.01)
*H04L 67/53* (2022.01)

(52) U.S. Cl.
CPC ............ *H04L 65/764* (2022.05); *H04L 65/40* (2013.01); *H04L 65/612* (2022.05); *H04L 67/53* (2022.05)

(58) Field of Classification Search
CPC ........ H04L 65/40; H04L 65/604; H04L 67/20
See application file for complete search history.

(56) References Cited

U.S. PATENT DOCUMENTS

| 6,502,193 B1* | 12/2002 | Barber | G06F 21/31 |
| | | | 707/999.009 |
| 7,937,485 B2 | 5/2011 | Whited et al. | |
| 8,463,884 B2* | 6/2013 | Clinton | H04W 8/245 |
| | | | 709/221 |
| 8,601,098 B2 | 12/2013 | Adelman et al. | |
| 9,176,721 B2 | 11/2015 | Mann | |

(Continued)

*Primary Examiner* — Richard G Keehn
(74) *Attorney, Agent, or Firm* — Fish & Richardson P.C.

(57) ABSTRACT

Methods, systems, and apparatus, including computer programs encoded on a computer storage medium, for persisting state of a streaming application are disclosed. In one aspect, a method includes the actions of receiving data indicating interaction with third-party content that is displayed with first-party content at a client device. The interaction with the third-party content initiates an application request for a streaming version of an application ("streaming application"). The actions further include generating a representation of the streaming application in response to the interaction with the third-party content at the client device. The actions further include receiving data indicating a user interaction with the representation of the streaming application at the client device. The actions further include generating and storing data indicating a first state of the streaming application at a first time based on the user interaction with the representation of the streaming application.

20 Claims, 4 Drawing Sheets

(56) References Cited

U.S. PATENT DOCUMENTS

| | | |
|---|---|---|
| 9,313,529 B2 | 4/2016 | Nilsson et al. |
| 2003/0046338 A1* | 3/2003 | Runkis ............... H04L 67/14 709/203 |
| 2005/0091316 A1* | 4/2005 | Ponce ............... H04L 69/329 709/205 |
| 2005/0188318 A1* | 8/2005 | Tamir ............... G06F 16/951 715/744 |
| 2006/0150224 A1 | 7/2006 | Kamariotis |
| 2007/0156856 A1* | 7/2007 | Shafron ............... G06F 9/454 709/219 |
| 2010/0042642 A1* | 2/2010 | Shahraray ............ G06F 16/955 707/756 |
| 2013/0173758 A1 | 7/2013 | Park et al. |
| 2013/0237318 A1* | 9/2013 | Colaco ............... A63F 13/61 463/31 |
| 2014/0052840 A1* | 2/2014 | Shukla ............... G06F 9/44505 709/223 |
| 2014/0199990 A1* | 7/2014 | Wolcott ............... H04W 92/06 455/422.1 |
| 2014/0250300 A1 | 9/2014 | Runkis |
| 2014/0307878 A1* | 10/2014 | Osborne ............ G10H 1/0008 381/56 |
| 2015/0019658 A1 | 1/2015 | Barrera et al. |
| 2015/0026708 A1* | 1/2015 | Ahmed ............ H04N 21/44218 725/12 |
| 2015/0135195 A1 | 5/2015 | Khare et al. |
| 2015/0286533 A1 | 10/2015 | Kaufthal et al. |

* cited by examiner

PERSISTING STATE OF A STREAMING APPLICATION

CROSS-REFERENCE TO RELATED APPLICATION

This application is a continuation application of U.S. application Ser. No. 16/406,280, filed May 8, 2019, which is a continuation application of U.S. application Ser. No. 15/213,994, now U.S. Pat. No. 10,326,806, filed Jul. 19, 2016, which is incorporated by reference in its entirety.

FIELD

This application relates to maintaining a state of an application.

BACKGROUND

A user may download and install applications onto a computing device. The user may interact with an installed application and save the user's progress. The next time that the user interacts with the installed application, the user can return to the point in the application where the user last saved the progress.

SUMMARY

Instead of downloading an application to a client device, a user may choose to stream the application. When a user streams an application, a remote virtual machine in the cloud executes the application and provides graphical information to the client device. The client device displays the graphical information so that the user can interact with the streaming application as if the client device were locally executing the application. As the user interacts with the streaming application, the client device sends interaction data back to the virtual machine. The virtual machine then processes the interaction data and updates the graphical information provided to the user device.

Once the user has finished interacting with the streaming application, the virtual machine stops executing the application and any actions completed or progress achieved in the streaming application are typically lost. If the user were later to locally install the application, then the user would begin interacting with the installed application as if the user never interacted with the streaming application. Instead of losing the state of the streaming application, the application may be configured so that the cloud stores state data of the streaming application for later retrieval when the user locally installs the application on the client device.

In order to save the state of a streaming application, the developer of the application includes code in the application that the virtual machine executes when the user finishes interacting with the streaming application. The code causes the virtual machine to provide a controller with the current state of the streaming application. The controller packages and stores the current state in the cloud for later retrieval once the application is locally installed on the client device. The developer of the application also includes code in the application that the client device executes when the user locally installs the application on the client device. The code causes the client device to query the cloud for any stored state information that exists from previous instances of streaming the application on the client device. If present, the controller in the cloud returns the stored state information, and the client device loads the state information into the locally-installed application. The first time that the user opens the locally-installed application, the user will see the same completed actions and progress achieved during streaming of the application.

According to an innovative aspect of the subject matter described in this application, a method for persisting state of a streaming application includes the actions of receiving, by a computing device, data indicating interaction with third-party content that is displayed with first-party content at a client device, where interaction with the third-party content initiates an application request for a streaming version of an application ("streaming application"). The actions further include generating, by a virtual machine, a representation of the streaming application in response to the interaction with the third-party content at the client device; updating a display of the client device to present the representation of the streaming application; receiving, from the client device, data indicating a user interaction with the representation of the streaming application at the client device, where the user interaction changes a state of the streaming application; generating and storing data indicating a first state of the streaming application at a first time based on the user interaction with the representation of the streaming application; at a second time after the first time, receiving, from a given device that is executing a locally-installed version of the application ("installed application"), a state request for a current state of the streaming application; and in response to the state request, updating a state of the installed application to match the first state of the streaming application, including providing, to the given device, state data specifying the first state of the streaming application.

These and other implementations can each optionally include one or more of the following features. The display of the client device is updated to present the representation of the streaming application without installing the application on the client device. The actions of generating and storing data indicating a first state of the streaming application at a first time based on the user interaction with the representation of the streaming application includes receiving data identifying the computing device. The data indicating the first state of the streaming application identifies the computing device. The actions of generating and storing data indicating a first state of the streaming application at a first time based on the user interaction with the representation of the streaming application include receiving data identifying a user of the client device. The data indicating the first state of the streaming application identifies the user of the client device.

The actions further include receiving, by the computing device, additional data indicating interaction with additional third-party content that is displayed with additional first-party content at the client device, where interaction with the additional third-party content initiates an additional application request for a streaming version of an additional application ("additional streaming application"); generating, by the virtual machine, a representation of the additional streaming application in response to the additional interaction with the additional third-party content at the client device; updating the display of the client device to present the representation of the additional streaming application; receiving, from the client device, data indicating a user interaction with the representation of the additional streaming application at the client device, where the user interaction changes a state of the additional streaming application; generating and storing data indicating a first state of the additional streaming application at a third time based on the user interaction with the representation of the additional streaming application; and after a particular period of time has elapsed, deleting the data indicating the first state of the additional streaming application. The actions further include generating data for requesting permission from a user of the client device to generate and store the first state of the streaming application; and receiving, from the user, data indicating permission to generate and store the first state of the streaming application.

The data indicating the first state of the streaming application is generated and stored based on receiving the data indicating permission to generate and store the first state of the streaming application. The data indicating the first state of the streaming application is serialized data. The actions further include, in response to receiving the data indicating interaction with the third-party content, generating data for prompting a user of the client device to either install or stream the application; and receiving, from the user, data indicating a request to stream the application. The virtual machine generates the representation of the streaming application based on receiving the data indicating the request to stream the application. The actions further include authenticating the state request for the current state of the streaming application. The state data specifying the first state of the streaming application is provided to the given device based on authenticating the state request for the current state of the streaming application. The actions further include determining an availability of the state data for the streaming application. The state data specifying the first state of the streaming application is provided to the given device based on determining the availability of the state data for the streaming application.

Other embodiments of this implementation include corresponding systems, apparatus, and computer programs recorded on computer storage devices, each configured to perform the operations of the methods.

According to an innovative aspect of the subject matter described in this application, a system for persisting state of a streaming application includes a controller that is configured to receive data indicating interaction with third-party content that is displayed with first-party content at a client device, where interaction with the third-party content initiates an application request for a streaming version of an application ("streaming application"); a virtual machine that is configured to generate a representation of the streaming application in response to the interaction with the third-party content at the client device; update a display of the client device to present the representation of the streaming application; and receive, from the client device, data indicating a user interaction with the representation of the streaming application at the client device, where the user interaction changes a state of the streaming application; and a data storage device that is configured to store state data, where the controller is further configured to: generate data indicating a first state of the streaming application at a first time based on the user interaction with the representation of the streaming application; store, in the data storage device, the data indicating the first state of the streaming application; at a second time after the first time, receive, from a given device that is executing a locally-installed version of the application ("installed application"), a state request for a current state of the streaming application; and in response to the state request, update a state of the installed application to match the first state of the streaming application, including providing, from the data storage device and to the given device, state data specifying the first state of the streaming application.

These and other implementations can each optionally include one or more of the following features. The display of the client device is updated to present the representation of the streaming application without installing the application on the client device. The controller actions of generating and storing data indicating a first state of the streaming application at a first time based on the user interaction with the representation of the streaming application include receiving data identifying the computing device. The data indicating the first state of the streaming application identifies the computing device. The controller actions of generating and storing data indicating a first state of the streaming application at a first time based on the user interaction with the representation of the streaming application include receiving data identifying a user of the client device. The data indicating the first state of the streaming application identifies the user of the client device. The controller is further configured to receive additional data indicating interaction with additional third-party content that is displayed with additional first-party content at the client device. Interaction with the additional third-party content initiates an additional application request for a streaming version of an additional application ("additional streaming application").

The virtual machine is further configured to generate a representation of the additional streaming application in response to the additional interaction with the additional third-party content at the client device; update the display of the client device to present the representation of the additional streaming application; and receive data indicating a user interaction with the representation of the additional streaming application at the client device, where the user interaction changes a state of the additional streaming application. The controller is further configured to generate and store data indicating a first state of the additional streaming application at a third time based on the user interaction with the representation of the additional streaming application; and after a particular period of time has elapsed, delete the data indicating the first state of the additional streaming application. The controller is further configured to generate data for requesting permission from a user of the client device to generate and store the first state of the streaming application; and receive, from the user, data indicating permission to generate and store the first state of the streaming application. The data indicating the first state of the streaming application is generated and stored based on receiving the data indicating permission to generate and store the first state of the streaming application.

The controller is further configured to in response to receiving the data indicating interaction with the third-party content, generate data for prompting a user of the client device to either install or stream the application; and receive, from the user, data indicating a request to stream the application. The virtual machine generates the representation of the streaming application based on receiving the data indicating the request to stream the application. The controller is further configured to authenticate the state request for the current state of the streaming application. The state data specifying the first state of the streaming application is provided to the given device based on authenticating the state request for the current state of the streaming application. The controller is further configured to determine an availability of the state data for the streaming application. The state data specifying the first state of the streaming application is provided to the given device based on determining the availability of the state data for the streaming application.

Other embodiments of this implementation include corresponding systems, apparatus, and computer programs recorded on computer storage devices, each configured to perform the operations of the methods.

The subject matter described in this specification may have one or more of the following advantages. Users are able to test out applications without downloading them and can save their progress so that they can start where they left off once they install the application on their device. Application developers can allow users to stream applications and save their progress which may include keeping items in a virtual shopping cart.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1:
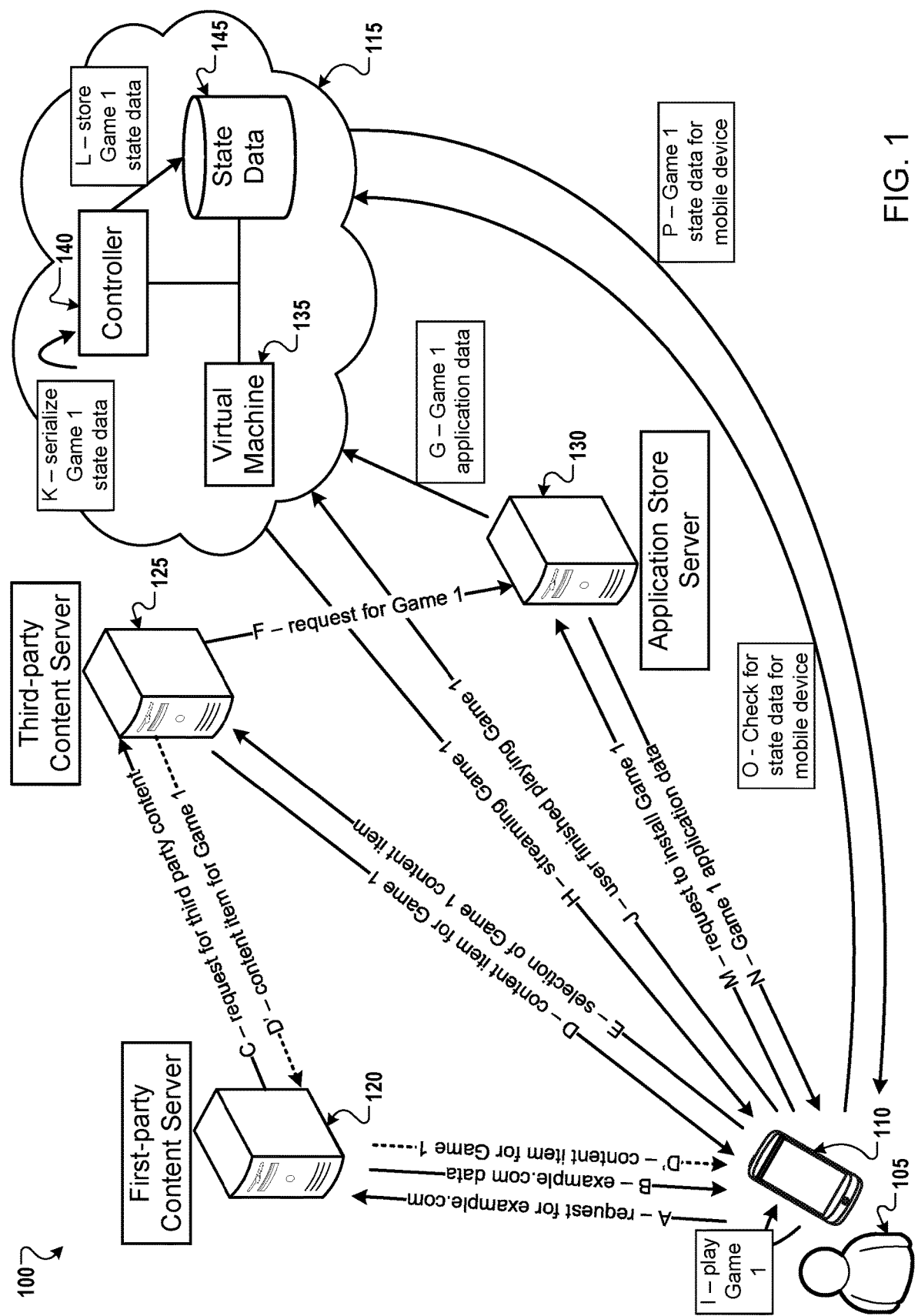
FIG. 1 illustrates an example system for persisting state of a streaming application.

FIG. 1 illustrates an example system 100 for persisting state of a streaming application. Briefly, and as described in more detail below, the user 105 views content provided by a first party on the client device 110. While viewing the first-party content, the user 105 interacts with content provided by a third-party. The interaction with the third-party content causes an application to begin streaming from the cloud 115. The user 105 interacts with the streaming application on the client device 110. Once the user 105 is done interacting with the streaming application, the cloud 115 stores the final state of the streaming application. When the user 105 installs the application on the client device 110, the client device 110 retrieves the state information of the application to return the application to the state where the user 105 left off with the streaming application.

In stage A, the user 105 interacts with the client device 110 and causes the client device 110 to request content from the first-party content server 120. The user 105 may be viewing a web page or interacting with an application on the client device 110. For example the user 105 may be viewing a web page from Example.com. As the user navigates the content provided by Example.com, the first-party content server 120, in stage B, provides data to the client device 110 for display. As another example, the user 105 may interact with an Example.com application that is installed on the client device 110. The user interactions cause the client device 110 to request and receive data from the first-party content server 120, which in this case would be an Example.com server.

In some instances, the first-party content server 120 may request, in stage C, that a third party content server 125 also provide content to the user device 110. The request from the first-party content server 120 may include a request for content that may be of particular interest to the user 105 or may include content that is related to the content presented by the first-party content server 120. Upon receiving the request, the third-party content server 125 then provides the third party content to the client device 110 in stage D. For example, the Example.com server may request third-party content that is of particular interest to the user. The third-party content server 125 determines that the user 105 is interested in gaming and may display a content item related to the game Game 1. As another example, the user 105 may be browsing gaming content provided by the Example.com server. The Example.com server requests that the third-party content server 125 provide content related to gaming to the client device 110 for display with the Example.com's gaming content. In some implementations, the third-party content server 125 may respond to the request for third party content at stage C by providing a content item to the first-party content server 120, which in turn provides the third party content item to the client device 110.

In some implementations, instead of stage D, the third-party content server 125 provides the requested content item to the first-party content server 120 which then provides the content item to the client device 110 in stage D'. For example, the third-party content server 125 receives the request for third-party content from the first-party content server 120. In response, the third-party content server 125 sends a Game 1 content item to the first-party content server 120 which then sends the Game 1 content item to the client device 110. In some implementations, the first-party content server 120 requests the content item before sending the first-party content data, e.g., stage B, and sends the content item along with the first-party content data. In some implementations, instead of stages C and D, the first-party content data, e.g., stage B, includes an empty slot for the client device 110 to fill with a content item. In this instance, the client device 110 receives the first-party content data and then requests and receives a content item from the third-party content server 125 to fill the empty slot.

The user 105 views the first-party content along with the third-party content and interacts with the third-party content. For example, the user 105 may select the third-party gaming content, and in stage E, the client device 110 provides data to the third-party content server 125 indicating that the user 105 selected the third-party gaming content. In some implementations, the user 105 may not select or interact with the third-party content. In this case, the user 105 may continue to browse the first-party content.

Once the third-party content server 125 receives the data indicating a user interaction from stage E, the third-party content server 125 provides a request for a related application to the application store server 130. The request includes data identifying the client device 110. The application store server 130 stores various applications that users can purchase and install on their devices. For example, the application store server 130 may include games such as Game 1, Game 3, or Game 2. The application store server 130 may also include applications related to social, travel, mapping, news, etc. The application store server 130 may provide the applications to the client device 110 for free or for a fee. When the application store server 130 receives the request for the application related to the third-party content, the application store server 130 retrieves the application data and provides the application data to the cloud 115 in stage G. As an example, the third-party content server 125 provides a request for the application Game 1 to the application store server 130. The application store server 130 retrieves the data for Game 1 and provides the data to the cloud 115.

The cloud 115 may represent one or more computing devices that have various functions and that are accessible over a network such as the internet. The cloud 115 includes a virtual machine 135 that is configured to execute an application and provide, over the network, a visualization of the executed application to an external device. The virtual machine 135 provides an impression to the user of the external device that the external device has installed and is executing the application. The virtual machine 135 provides the majority of the processing functionality in executing the application and provides a graphical output to the external device. The external device returns data indicating user interaction with the graphical output back to the virtual machine 135. The cloud 115 also include a controller 140 that is configured to manage the operations of the virtual machine 135 and the other functions of the cloud 115.

The cloud 115 receives the application data from the application store server 130. In stage H, the controller 140 instructs the virtual machine 135 to begin executing the application data and streaming the application to the client device 110. For example, the virtual machine 135 executes the Game 1 application and streams Game 1 to the client device 110. The client device 110 displays the streaming Game 1 application to give the user 105 the impression that the client device 110 is executing the Game 1 application. In stage I, the user 105 interacts with the streaming application. For example, the user may play the Game 1 application and advance past the first level. In another example, the application may be a shopping application and the user may browse the online store and place an item in a virtual shopping cart. As the user 105 interacts with the streaming application, the client device 110 provides data to the cloud 115. For example, if the user 105 presses a button or selects an item on the streaming application, that button press or selection is transmitted to the virtual machine 135 in the cloud 115 so that the virtual machine 135 can update the streaming application accordingly.

In stage J, the user 105 provides an indication that the user 105 is finished interacting with the streaming application. The indication may include the user navigating to another application on the client device 105. For example, the user may close the application that displayed the first-party content and open another application. The user 105 may not close the application that displayed the first-party content but instead just switch to viewing another application. The indication may include the user 105 selecting a "finished" or "exit" button on the streaming application. In some implementations, the indication may come from the application itself. The application may include data that indicates the application can only stream for a particular number of minutes, until the user 105 reaches a certain point in the streaming application, or if the user has not interacted with the application for a specified period of time, e.g., a "timeout" interval. In some implementations, the specified period of time may be common for all application and be set by the controller 140. Restrictions such as these may be useful for applications where the application developer is trying to provide the user 105 a sample of the application (e.g., a free trial) in hopes that the user 105 will purchase the full application.

Once the user 105 has finished interacting with the streaming application, the virtual machine 135 finishes executing the application. If the developer of the application has implemented a feature to save the state of the streaming application, then upon finishing execution of the application, the virtual machine 135 executes the code in the application to save the state. The state of the application may include details and history related to interaction that the user 105 had with the application. For example, the state may include details related to the level that the user 105 reached or to the items viewed and the items placed in a virtual shopping cart. When the virtual machine 135 executes the code to save the state of the application, the virtual machine 135 serializes the state data in stage K and provides the serialized state data to the controller 140. For example, the virtual machine 135 may serialize data that indicates the user reached level 3 on Game 1 before the user 105 stopped interacting with the streaming application. In some implementations, when the virtual machine 135 executes the code to save the state of the application, the virtual machine 135 provides the state data to the controller 140 which then serializes the state data.

In stage L, the controller 140 stores the serialized state data in the state data storage 145. The state data storage 145 may be also located in the cloud 115 and may be included in the same computing device as the controller 140 or the virtual machine 135 or may be located in one or more other computing devices. The state data storage 135 stores the serialized state data as well as a date that identifies where the state data originated, such as data that identifies the client device 110. The state data store 135 may also store data that identifies the time and date that the state data was generated. For example, if the user 105 played Game 1 on Apr. 4, 2016, at 10:00 am on the client device 110 and reached level 3, then the state data may indicate Game 1, Level 3, client device 110, and Apr. 4, 2016, at 10:00 am in a serialized format. The state data 135 may also include data identifying the user who interacted with the streaming application, for example, a user identifier or a set of credentials for the user who is authorized to fetch the state data 135. With the data identifying the user, the controller 140 will not provide the state data 135 to a different user than the one identified.

At a later time, the user 105 browses the application store by accessing the application store server 130 using the client device 110. The user 105 selects to download the application that the cloud 115 previously streamed to the client device 110. In stage M, the application store server 130 receives the request for the application from the client device 110, and in stage N, the application store server 130 provides the application to the client device 110. As an example, the client device 110 sends a request for the Game 1 application to the application store server 130. In response to the request, the application store server 130 downloads the Game 1 application to the client device 110. Once the client device 110 receives the Game 1 application, then the client device 110 begins to install the application. In some implementations, the application store server 130 collects a payment from the user 105 for the purchase of the application. For example, the application store server 130 may charge the user's credit card a predetermined amount (e.g., two dollars) for downloading Game 1.

In some implementations, the user 105 may request to download the application using an alternate technique. The controller 140 may send a message to the client device 110 after the user 105 has finished interacting with the streaming application in which the controller invites the user 105 to download the application or to complete the purchase of the item in the shopping cart. The message may be an email message, a text message, an instant message, or any other type of message that is configured to include data to assist the user in downloading the application, such as a hyperlink. The user 105 may also request to download the application by again selecting a content item related to the application.

Once the client device 110 downloads the application from the application store server 130, the client device 110 locally installs the application on the client device 110. As the client device 110 installs the application, the installation code in the application may instruct the client device 110 to check the cloud 115 for any state information related to the application. Upon execution of the code and in stage O, the client device 110 sends a request to the cloud 115 for stored state information from previously streaming the application. The request may include the identity of the client device 110 and may include a user's credentials to prevent impersonation by other users. For example, the client device 110 executes the installation code for Game 1. The developers may include code in the installation code to instruct the client device 110 to check the cloud 115 for any state information from a previous interaction with a streaming Game 1. The client device 110 executes that code during the installation and requests state data from the cloud 115 and includes, in the request, data identifying the client device 110 and data identifying the application.

The cloud 115 receives the request for state data, and the controller 140 handles the request. The controller 140 queries the state data storage 145 for state data that is related to the application identified in the request and related to the client device 110. The state data store 145 searches for and returns to the controller 140 state data for the application. In stage P, the controller 140 provides the state data to the client device 110. As an example, the controller 140 requests Game 1 state data for the client device 110. The state data storage 145 searches for and identifies the Game 1 state data that corresponds to the client device 110. The controller 140 returns the Game 1 state data to the client device 110. The client device then loads the state into the installed application so that the first time the user 105 runs the locally-installed application on the client device 110, the application is in the same state as when the user quit or stopped using the streaming application.

In some implementations, the cloud 115 may only store the state data for a particular period of time. Once the particular period of time has elapsed, then the controller 140 removes the corresponding state data from the state data storage 145. In some implementations, rather than removing the corresponding state data from the state data storage after the particular period of time has elapsed, the controller 140 may permit the state data storage 145 to write over the state data. The particular period of time may be set by the controller 140. For example, the controller may remove state data from the state data storage 145 after the state data storage 145 has stored the state data for thirty days. For example, had the user 105 not installed the Game 1 application onto device 110 within thirty days of streaming the Game 1 application, the controller 140 would have deleted the state data. If the user 105 downloaded Game 1 after thirty days, then the user 105 would have to start from the beginning of the game instead of starting from the level achieved while streaming of the application.

In some implementations, the user 105 may specify the length of time that the cloud 115 stores the state data. The user 105 may specify a time period through a setting located in the client device 110. For example, the user 105 may specify in a settings menu that the state data be stored for sixty days. In some implementations, the cloud 115 may limit the length of time such that the user may not select more than the maximum set by the cloud 115. The user may also specify the time period at the time that the user 105 finishes interacting with the streaming application. For example, the user 105 may finish interacting with the streaming version of Game 1. The controller 140 may prompt the user 105 for the length of time that the user 105 would like to save the user's progress in Game 1. The user 105 may select to save the data for fourteen days. Again, the cloud 115 may set a maximum amount of time up to which the user 105 can select a time period. When the cloud 115 receives the user-specified duration, then the controller 140 adds that information to the state data when the controller 140 stores the state data in the state data storage 145.

In some implementations, the controller 140 deletes the state data from the state data storage 145 after the cloud 115 provides the state data to the client device 110 for updating a locally-installed application. For example, once the user 105 downloads and installs Game 1 on the client device 110 and the cloud 140 provides the state data for the streaming of Game 1 on the client device 110, the controller 140 deletes the state data from the state data storage 145.

In some implementations, the cloud 115 may send a notification to the user 105 or to the client device 110 when the state data is about to be deleted. The notification may be an email message, a text message, an instant message, or any other type of message that is configured to include data to assist the user 105 in downloading the application, such as a hyperlink. The notification may indicate that the state data may be deleted soon and that the user 105 should download the application to take advantage of the stored state data. In some implementations, the notification may occur through a content item provided by the third-party content server 125. The third-party content item may highlight the application and indicate the time remaining to take advantage of the stored state data. The third-party content item may even offer an incentive to the user to download applications, such as a certain discount for the application (e.g., a certain percentage discount, making the application free, providing a credit for another application with purchase of one application).

In some implementations, the cloud 115 may store state data for a period of time that is based on the particular application. The period of time may be specified by the developer of the application. The developer may specify in the code of the application to store the state data for sixty days. As with the implementations described above, the cloud 115 may set a maximum storage period. If the application specifies a time period over the maximum, then the cloud 115 sets the storage period to the maximum for that particular application. The period of time may also be based on the size of the state data. The cloud 115 may store state data that requires smaller amounts of storage for a longer period of time than state data that requires larger amounts of storage. For example, an application that requires one hundred megabytes of storage for state data may be stored for thirty days, while an application that requires five megabytes of storage for state data may be stored for ninety days. The period of time may also be based on a fee collected by the operator of the cloud 115 from the developer or seller of the application. The application developer or seller may pay more for increasingly longer storage periods of state data.

Figure 2:
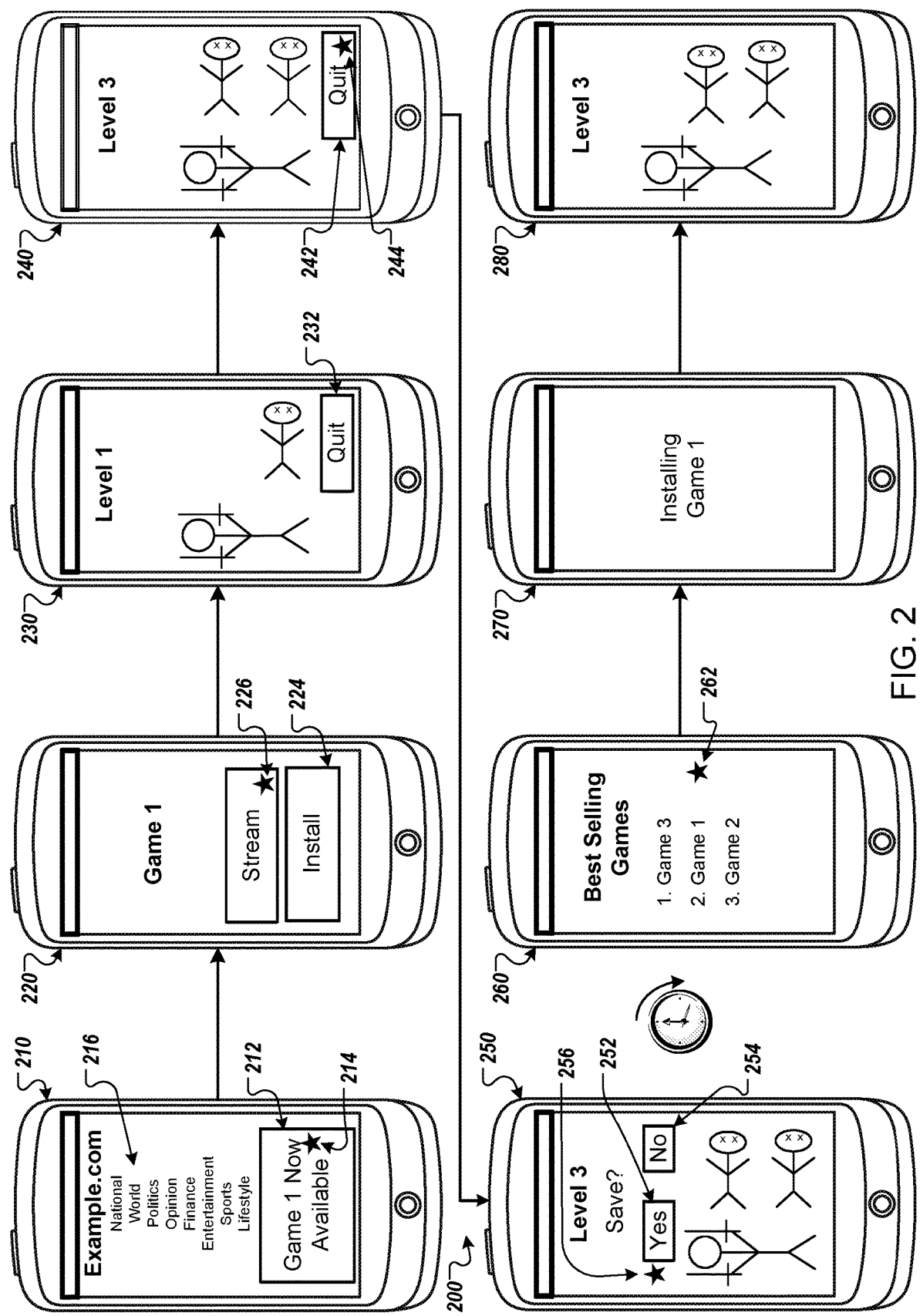
FIG. 2 illustrates example screen shots of a computing device streaming an application and then installing the application.

FIG. 2 illustrates example screen shots 200 of a computing device streaming an application and then installing the application. The screen shots 200 illustrate the display of the client device 110 when streaming an application, saving the state of the streaming application in the cloud, later installing the application on the client device 110, and retrieving the state of the application. The screen shots 200 are illustrated on a display of a mobile device, but may be viewed on any computing device that is configured to display a streaming application and locally install the application.

Screen shot 210 illustrates the client device as the user is viewing an application. The application displays first-party content 216 from a first-party server such as Example.com. The application may be a browser application or a specific application that is configured to display Example.com data. The screen shot 210 also includes a selectable third party content item 212. In the example street shot 210, the content item 212 includes data highlighting the Game 1 application. A third-party content server provides the content item 212. In some implementations, the first-party content provider may receive a fee for displaying the third-party content item. The user's selection of the content item 212 is illustrated by the star 214.

Upon selection of the content item 212, the client device displays screen shot 220. The screen shot 220 presents two options to the user. The user may select option 222 to initiate streaming of the Game 1 application or select option 224 to download and install the Game 1 application. The user's selection of option 222 is illustrated by the star 226.

In some implementations, the back end system, for example, system 100 or cloud 105 from FIG. 1, may not display the screen shot 220 and instead automatically initializes streaming of the application highlighted by the content item 212. For example, once the user selects content item 212, the client device then displays the representation of the streaming application as illustrated in screen shot 230. In some implementations, the decision by the back end system to automatically stream the application may be based on a setting that the user selected. For example, the user may have previously indicated in a settings menu to prompt the user to select streaming or installing of an application, or the user may indicate in the settings menu to automatically stream the application without prompting the user.

In some implementations, the back end system may check to determine whether the user has previously streamed the application. In this instance, the system may check previously stored state data that corresponds to either the client device or the user, depending on how the state data is stored. If the user or the client device has previously streamed the application, then the back end system may request permission to install the application. In some implementations, if the user or the client device has previously streamed the application, then the back end system may load the state data from the previous streaming of the application and begin streaming the application with the stored state data. In some implementations, if the user or the client device has previously streamed the application, then the user may be required to download and install the application if the user wishes to interact with the application, instead of streaming the application again.

In some implementations, the action that the back end system takes when the user previously streamed the application may be based on instructions in the code of the application or on instructions from the developer or seller of the application. For example, an application that has a primary revenue stream based on selling copies of the application may wish to limit streaming of the application and force users to buy the application. An application that has a primary revenue stream based on selling items or services in the application may not wish to limit streaming of the application and instead allow users to stream the application numerous times and each time load the previous state data.

Once the back end system initiates streaming of the application, the client device begins to display the representation of the streaming application as received from the back end system as illustrated in screen shot 230. In screen shot 230 the user begins interacting with the application for the first time. After interacting with the application, the user may advance to screen shot 240. For example, the user may advance from level 1 to level 3 in Game 1. On the screen shots 230 and 240 may be selectable buttons 232 and 242. The user may select the buttons 232 and 242 to quit streaming the application. As illustrated with star 244, the user selects button 242 to quit streaming the application. When the user selects button 242 to quit streaming the application, the client device provides the back end system data indicating that the user pressed the screen at a particular location. The back end system receives the data indicating the screen press at the particular location and determines that the user pressed the button 242. Based on determining that the user pressed the button 242, the back end system initiates code to begin stopping to stream the application.

Once the back end system receives the indication to stop streaming the application, the back end system provides data to the client device to display screen shot 250. The screen shot 250 presents the user the option to save the progress in the application before exiting the streaming application and losing the progress. The user may select button 252 to initiate saving of the state of the streaming application, or the user may select button 254 to not save the state of the streaming application. As illustrated with star 256, the user selects button 252, and the back end system stores state data indicating the client device or the user or both along with data indicating Game 1, level 3, and the date and time. In some implementations, the state data also include a time period for which to store the state data. In some implementations, the state data includes only a subset of the data listed above.

In some implementations, the back end system may not cause the client device to display screen shot 250. For example, the back end system may automatically save the state of the application without prompting the user. To determine whether to automatically save the state of the application, the back end system may check user-selected settings. The user may select from a settings menu whether to save state data for streaming applications automatically, none of the time, or based on a prompt after each streaming application.

In some implementations, the back end system stores the state data and identifies the user in the state data. To identify the user, the back end system may check whether the user is logged into the application that presented the first-party content. The user may also provide identifying information through a settings menu to identify subsequently stored state data. In some implementations, the back end system stores the state data and identifies the client device in the state data. To identify the client device, the back end system, either automatically or upon request, accesses or requests data identifying the client device, such as a phone number, MAC address, IMEI number, ICCID number, model and serial number, or any other unique information. In some implementations, the back end system stores the state data with both data identifying the user and data identifying the client device. In some implementations, the back end system may also store challenge data with the state data. The challenge data will be used to authenticate a future request for the state data. The challenge data may include a password or PIN that the user later inputs when the client device requests the state data. Alternatively, the challenge data may include data stored by the client device and later provided by the client device when requesting challenge data.

After a period of time, which may occur right after the back end system stores the state data or a couple of weeks after the back end system stores the state data, the user navigates to screen shot 260 that allows the user to select the streamed application for download to the client device. As illustrated in screen shot 260, the user navigates in the application store to a page highlighting the best-selling games. As indicated by the star 262, the user selects to download the Game 1 game, which corresponds to the previously streamed application.

As illustrated in screen shot 270, the client device begins installing the selected application. As the client device installs the selected application and executes the installation code of the application, the code may instruct the client device to query the back end system for any existing state data. The client device may prompt the user before querying the back end system for state data, or the client device may query the back end system automatically. If the back end system determines that state data exists, then the back end system provides the state data to the client device. The client device may prompt the user to load the state data, or the client device may load the state data automatically. In some implementations, the user may have selected whether to receive a prompt for checking for state data and loading state data or for the client device to perform those functions automatically selecting options in a settings menu. In some implementations, where the state data includes both user and client device information, the back end system may provide state data that matches either the user or the client device. Alternatively, the back end system may provide state data that matches both the user and the client device. In some implementations, the user may input or the client device may provide challenge data for the back end system to compare to the stored challenge data in order to authenticate the request.

Once the client device receives the state data and any necessary permissions to load the state data into the installed application, the user may open the application and begin interacting with the installed application with the same state as where the user left off in the streaming application. As illustrated in screen shot 280, the user automatically returned to level three in Game 1 without having to start at level one. Level three is the same level where the user left off in screen shot 250 when the user quit the streaming application.

Figure 3:
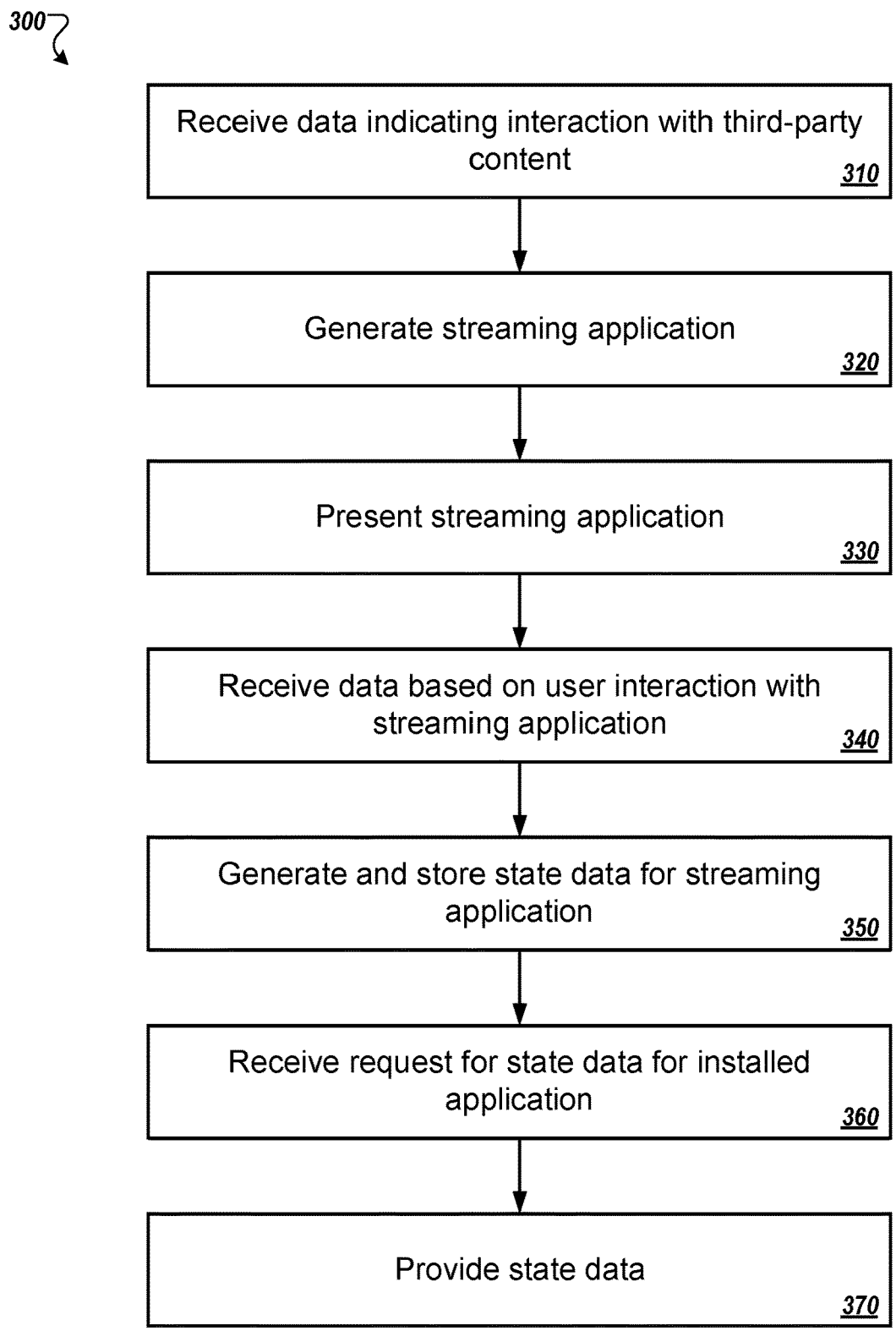
FIG. 3 illustrates an example process for persisting state of a streaming application.

FIG. 3 illustrates an example process 300 for persisting state of a streaming application. In general, the process 300 stores the state of a streaming application for later retrieval when the application is installed on a client device. The process 300 will be described as being performed by a computer system comprising one or more computers, for example, the system 100 as shown in FIG. 1. In some implementations, the process 300 may be performed by a computer system comprising one or more computers, for example, cloud 115 as shown in FIG. 1.

The system receives data indicating interaction with third-party content that is displayed with first-party content at a client device. Interaction with the third-party content initiates an application request for a streaming version of an application ("streaming application") (310). For example, a user may be viewing first-party content provided by Example.com, and displayed along with the first-party content is third-party content for the application Game 1. The user selects the third-party content item which initiates streaming of the Game 1 application.

The system generates a representation of the streaming application in response to the interaction with the third-party content at the client device (320). For example, a virtual machine of the system, executes the Game 1 application remotely and provides graphical data to the client device to give the user the impression that the client device is locally executing Game 1. In some implementations, the system determines that the application includes data for generating the representation of the streaming application. In this instance, the system generates the representation of the streaming application based on determining that the application includes the data for generating the representation of the streaming application. In some implementations, the system generates data for prompting a user of the client device to either install or stream the application in response to receiving the data indicating interaction with the third-party content. The system receives, from the user, data indicating a request to stream the application. In this instance, the system generates the representation of the streaming application based on receiving the data indicating the request to stream the application. For example, once the user interacts with the Game 1 content, the system prompts the user whether to begin streaming the application. If the user agrees to begin streaming the application, then the system begins streaming the application.

The system updates a display of the client device to present the representation of the streaming application (330). In some implementations, the system updates the display of the client device to present the representation of the streaming application without installing the application on the client device. The system receives from the client device, data indicating a user interaction with the representation of the streaming application at the client device, where the user interaction changes a state of the streaming application (340). For example, the user plays the Game 1 application as if the application is installed on the client device, but instead, the virtual machine of the system streams the application and receives data indicating the user interaction with the streaming application. The virtual machine receives the data and updates the streaming application and the representation of the application on the client device.

The system generates and stores data indicating a first state of the streaming application at a first time based on the user interaction with the representation of the streaming application (350). For example, the system generates data that indicates the level that the user reached while playing the streaming Game 1. In some implementations, the system receives data identifying the computing device. In this instance, the data indicating the first state of the streaming application identifies the computing device. For example, the system receives the MAC address of the client device and includes the MAC address in with the stored data indicating the first state. In some implementations, the system receives data identifying a user of the client device. In this instance, the data indicating the first state of the streaming application identifies the user of the client device. For example, the user may be logged into the application that presents the first-party content. If the client device provides that user-identifying information, then the system may store the user-identifying information along with the data indicating the first state of the streaming application. As another example, the user may be logged into the application store, which provides streaming and downloadable applications. The user identifier or login credential for the application store may be stored with the state data.

In some implementations, the system generates data for requesting permission from a user of the client device to generate and store the first state of the streaming application. The system receives, from the user, data indicating permission to generate and store the first state of the streaming application. In this instance, the system generates and stores the data indicating the first state of the streaming application based on receiving the data indicating permission to generate and store the first state of the streaming application. For example, after the user has finished interacting with the streaming Game 1 application, the system may prompt the user whether to save the first state of the Game 1 application. In some implementations the first state of the streaming application is serialized data. In this instance, serialized data is data that is not packaged in any particular format. The system formats and encodes the data as specified by the application. In some instances, the serialized data will only be readable by the application as its data fields may not be indicated in the data. The application identifies the data fields based on the location in the serialized data.

At a second time after the first time, the system receives, from a given device that is executing a locally-installed version of the application ("installed application"), a state request for a current state of the streaming application (360). For example, the client device downloaded and installed the Game 1 application. While installing the application, the client device requests the state data from the system. In response to the state request, the system updates a state of the installed application to match the first state of the streaming application, including providing, to the given device, state data specifying the first state of the streaming application (370). In some implementations, the system authenticates the state request for the current state of the streaming application. In this instance, the system provides the state data specifying the first state of the streaming application to the given device based on authenticating the state request for the current state of the streaming application. For example, the user may enter a password that the user received when the user finished with the streaming application. As another example, the user may be required to authenticate himself or herself by logging into the application store. In some implementations, the system determines an availability of the state data for the streaming application. In this instance, the system provides the state data specifying the first state of the streaming application to the given device based on determining the availability of the state data for the streaming application. For example, the system checks the state data storage to determine if there is state data for Game 1. If such state data is present in the state data storage, then the system provides the state data for Game 1. In some implementations, there may be multiple states stored during streaming. In this instance, the system provides the final state, or state that is captured later in the streaming, to the client device.

In some implementations, the system receives additional data indicating interaction with additional third-party content that is displayed with additional first-party content at the client device. Interaction with the additional third-party content may initiate an additional application request for a streaming version of an additional application ("additional streaming application"). The system generates a representation of the additional streaming application in response to the additional interaction with the additional third-party content at the client device. The system updates the display of the client device to present the representation of the additional streaming application. The system receives, from the client device, data indicating a user interaction with the representation of the additional streaming application at the client device. The user interaction may change a state of the additional streaming application. The system generates and stores data indicating a first state of the additional streaming application at a third time based on the user interaction with the representation of the additional streaming application. After a particular period of time has elapsed, the system deletes the data indicating the first state of the additional streaming application. For example, if the user does not install Game 1 after a particular period of time, such as thirty days, then the system deletes the state data.

In some implementations, instead of viewing content provided by a first-party content server, the user may browse the applications available through the application store server. The application store server may provide the option to stream applications for which the streaming option is available. The application store server may identify the user when the user logs into the application store server and may provide a user identifier to the controller for inclusion in the state data. The application store server may then authenticate a user by requiring the user to log into the application store before providing the user's device with the saved state information.

The subject matter described in this specification may have one or more of the following technical advantages. The system may save network bandwidth by not requiring users to download a full application to try out the application. Instead, the system can stream the application. The system can save processing capacity on the client device by not requiring users to install a full application to try out the application. The system can save battery life on the client device by not requiring the user to redo each action that the user performed on the streaming application when the user downloads the application.

Figure 4:
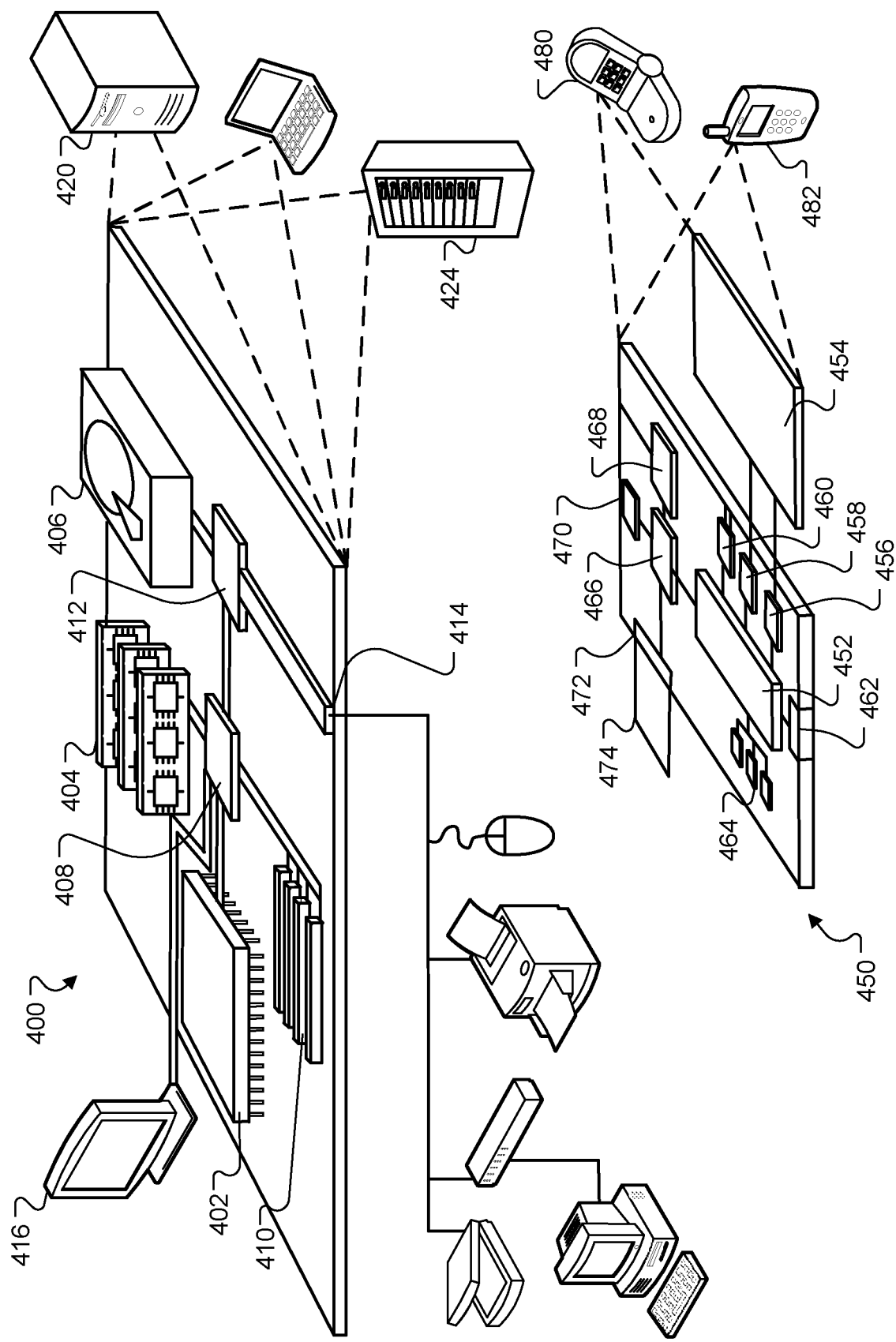
FIG. 4 illustrates an example of a computing device and a mobile computing device.

FIG. 4 shows an example of a computing device 400 and a mobile computing device 450 that can be used to implement the techniques described here. The computing device 400 is intended to represent various forms of digital computers, such as laptops, desktops, workstations, personal digital assistants, servers, blade servers, mainframes, and other appropriate computers. The mobile computing device 450 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 400 includes a processor 402, a memory 404, a storage device 406, a high-speed interface 408 connecting to the memory 404 and multiple high-speed expansion ports 410, and a low-speed interface 412 connecting to a low-speed expansion port 414 and the storage device 406. Each of the processor 402, the memory 404, the storage device 406, the high-speed interface 408, the high-speed expansion ports 410, and the low-speed interface 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as a display 416 coupled to the high-speed interface 408. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of computer-readable medium, such as a magnetic or optical disk.

The storage device 406 is capable of providing mass storage for the computing device 400. In some implementations, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 402), perform one or more methods, such as those described above. The instructions can also be stored by one or more storage devices such as computer- or machine-readable mediums (for example, the memory 404, the storage device 406, or memory on the processor 402).

The high-speed interface 408 manages bandwidth-intensive operations for the computing device 400, while the low-speed interface 412 manages lower bandwidth-intensive operations. Such allocation of functions is an example only. In some implementations, the high-speed interface 408 is coupled to the memory 404, the display 416 (e.g., through a graphics processor or accelerator), and to the high-speed expansion ports 410, which may accept various expansion cards. In the implementation, the low-speed interface 412 is coupled to the storage device 406 and the low-speed expansion port 414. The low-speed expansion port 414, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile device, such as a mobile computing device 450. Each of such devices may contain one or more of the computing device 400 and the mobile computing device 450, and an entire system may be made up of multiple computing devices communicating with each other.

The mobile computing device 450 includes a processor 452, a memory 464, an input/output device such as a display 454, a communication interface 466, and a transceiver 468, among other components. The mobile computing device 450 may also be provided with a storage device, such as a micro-drive or other device, to provide additional storage. Each of the processor 452, the memory 464, the display 454, the communication interface 466, and the transceiver 468, are interconnected using various buses, and several of the components may be mounted on a common motherboard or in other manners as appropriate.

The processor 452 can execute instructions within the mobile computing device 450, including instructions stored in the memory 464. The processor 452 may be implemented as a chipset of chips that include separate and multiple analog and digital processors. The processor 452 may provide, for example, for coordination of the other components of the mobile computing device 450, such as control of user interfaces, applications run by the mobile computing device 450, and wireless communication by the mobile computing device 450.

The processor 452 may communicate with a user through a control interface 458 and a display interface 456 coupled to the display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a SIMM (Single In Line Memory Module) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provide as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. The instructions, when executed by one or more processing devices (for example, processor 452), perform one or more methods, such as those described above. The instructions can also be stored by one or more storage devices, such as one or more computer- or machine-readable mediums (for example, the memory 464, the expansion memory 474, or memory on the processor 452). In some implementations, the instructions can be received in a propagated signal, for example, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 468 using a radio-frequency. In addition, short-range communication may occur, such as using a Bluetooth, WiFi, or other such transceiver. In addition, a GPS (Global Positioning System) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in the figure. For example, it may be implemented as a cellular telephone 480. It may also be implemented as part of a smart-phone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method comprising:
   receiving, by a server system and from a user device of a user, a request for a graphical interface of a web-based application accessed at the server system;
   in response to the request for the graphical interface of the web-based application, providing, by the server system and to the user device, the graphical interface of the web-based application;
   prompting the user to choose between (i) using the graphical interface of the web-based application presented in a browser executing at the user device and (ii) using a locally-installed application that is installed on the user device; and
   in response to the user choosing to use the locally-installed application, providing (i) state data specifying a current state of the web-based application, and (ii) instructions that update a state of the locally-installed application being locally executed at the user device to match the current state of the web-based application.

2. The method of claim 1, wherein a display of the user device is updated to present the graphical interface to the web-based application without installing the locally-installed application on the user device.

3. The method of claim 1, comprising generating and storing data indicating a changed state of the web-based application with data that identifies the user device.

4. The method of claim 3, wherein generating and storing data indicating a changed state of the web-based application comprises generating and storing data indicating an item placed in a virtual shopping cart by the user.

5. The method of claim 1, comprising:
   receiving, by the server system, data indicating interaction with third-party content that is displayed with first-party content at the user device;
   in response to the interaction with the third-party content at the user device, initiating, by the server system, a request for a streaming application;

in response to the request for the streaming application:
  executing, by the server system, the streaming application, and
  generating, by the server system, a graphical representation of the streaming application;
providing, by the server system and to the user device, the graphical representation of the streaming application and instructions to display the graphical representation of the streaming application on the display of the user device;
receiving, from the user device and by the server system, data indicating a user interaction with the graphical representation of the streaming application at the user device;
determining, by the server system, that the user interaction changed a state of the streaming application;
based on determining that the user interaction changed the state of the streaming application, generating and storing, by the server system, data indicating the changed state of the streaming application; and
after a particular period of time has elapsed after storing the data indicating the changed state of the streaming application, deleting the data indicating the changed state of the streaming application.

6. The method of claim 5, wherein:
the streaming application is a game application; and
the server system executes the game application, generates the graphical representation of the game application, and stores game progress as the user interacts with the graphical representation of the game application.

7. The method of claim 1, comprising:
receiving a request for the current state of the web-based application;
authenticating the request for the current state of the web-based application, wherein the instructions that update the state of the locally-installed application are provided based on authenticating the request for the current state of the web-based application.

8. A system comprising:
a memory and one or more data processing apparatus, wherein the one or more data processing apparatus are configured to execute instructions that cause the one or more data processing apparatus to perform operations including:
  receiving, from a user device of a user, a request for a graphical interface of a web-based application accessed at a server;
  in response to the request for the graphical interface of the web-based application, providing, to the user device, the graphical interface of the web-based application;
  prompting the user to choose between (i) using the graphical interface of the web-based application presented in a browser executing at the user device and (ii) using a locally-installed application that is installed on the user device; and
  in response to the user choosing to use the locally-installed application, providing (i) state data specifying a current state of the web-based application, and (ii) instructions that update a state of the locally-installed application being locally executed at the user device to match the current state of the web-based application.

9. The system of claim 8, wherein a display of the user device is updated to present the graphical interface to the web-based application without installing the locally-installed application on the user device.

10. The system of claim 8, wherein the instructions cause the one or more data processing apparatus to perform operations comprising generating and storing data indicating a changed state of the web-based application with data that identifies the user device.

11. The system of claim 10, wherein generating and storing data indicating a changed state of the web-based application comprises generating and storing data indicating an item placed in a virtual shopping cart by the user.

12. The system of claim 8, wherein the instructions cause the one or more data processing apparatus to perform operations comprising:
  receiving, by the server, data indicating interaction with third-party content that is displayed with first-party content at the user device;
  in response to the interaction with the third-party content at the user device, initiating, by the server, a request for a streaming application;
  in response to the request for the streaming application:
    executing, by the server, the streaming application, and
    generating, by the server, a graphical representation of the streaming application;
  providing, by the server and to the user device, the graphical representation of the streaming application and instructions to display the graphical representation of the streaming application on the display of the user device;
  receiving, from the user device and by the server, data indicating a user interaction with the graphical representation of the streaming application at the user device;
  determining, by the server, that the user interaction changed a state of the streaming application;
  based on determining that the user interaction changed the state of the streaming application, generating and storing, by the server, data indicating the changed state of the streaming application; and
  after a particular period of time has elapsed after storing the data indicating the changed state of the streaming application, deleting the data indicating the changed state of the streaming application.

13. The system of claim 12, wherein:
the streaming application is a game application; and
the server executes the game application, generates the graphical representation of the game application, and stores game progress as the user interacts with the graphical representation of the game application.

14. The system of claim 8, wherein the instructions cause the one or more data processing apparatus to perform operations comprising:
  receiving a request for the current state of the web-based application;
  authenticating the request for the current state of the web-based application, wherein the instructions that update the state of the locally-installed application are provided based on authenticating the request for the current state of the web-based application.

15. A non-transitory computer-readable medium storing instructions executable by one or more computers which, upon such execution, cause the one or more computers to perform operations comprising:
  receiving, from a user device of a user, a request for a web-based application a graphical interface of a web-based application accessed at a server system;
  in response to the request for the graphical interface of the web-based application, providing, to the user device, the graphical interface of the web-based application;

prompting the user to choose between (i) using the graphical interface of the web-based application presented in a browser executing at the user device and (ii) using a locally-installed application that is installed on the user device; and in response to the user choosing to use the locally-installed application, providing (i) state data specifying a current state of the web-based application, and (ii) instructions that update a state of the locally-installed application being locally executed at the user device to match the current state of the web-based application.

16. The non-transitory computer-readable medium of claim 15, wherein a display of the user device is updated to present the graphical interface to the web-based application without installing the locally-installed application on the user device.

17. The non-transitory computer-readable medium of claim 15, wherein the instructions cause the one or more computers to perform operations comprising generating and storing data indicating a changed state of the web-based application with data that identifies the user device.

18. The non-transitory computer-readable medium of claim 17, wherein generating and storing data indicating a changed state of the web-based application comprises generating and storing data indicating an item placed in a virtual shopping cart by the user.

19. The non-transitory computer-readable medium of claim 16, wherein the instructions cause the one or more computers to perform operations comprising:

receiving data indicating interaction with third-party content that is displayed with first-party content at the user device;

in response to the interaction with the third-party content at the user device, initiating a request for a streaming application;

in response to the request for the streaming application:
executing the streaming application, and
generating a graphical representation of the streaming application;

providing, to the user device, the graphical representation of the streaming application and instructions to display the graphical representation of the streaming application on the display of the user device;

receiving, from the user device, data indicating a user interaction with the graphical representation of the streaming application at the user device;

determining that the user interaction changed a state of the streaming application;

based on determining that the user interaction changed the state of the streaming application, generating and storing data indicating the changed state of the streaming application; and after a particular period of time has elapsed after storing the data indicating the changed state of the streaming application, deleting the data indicating the changed state of the streaming application.

20. The non-transitory computer-readable medium of claim 19, wherein:
the streaming application is a game application; and
the one or more computers execute the game application, generate the graphical representation of the game application, and store game progress as the user interacts with the graphical representation of the game application.

* * * * *